Jan. 11, 1938.  A. G. SMITH  2,104,934
RELIEF VALVE
Filed Nov. 5, 1936  4 Sheets-Sheet 1
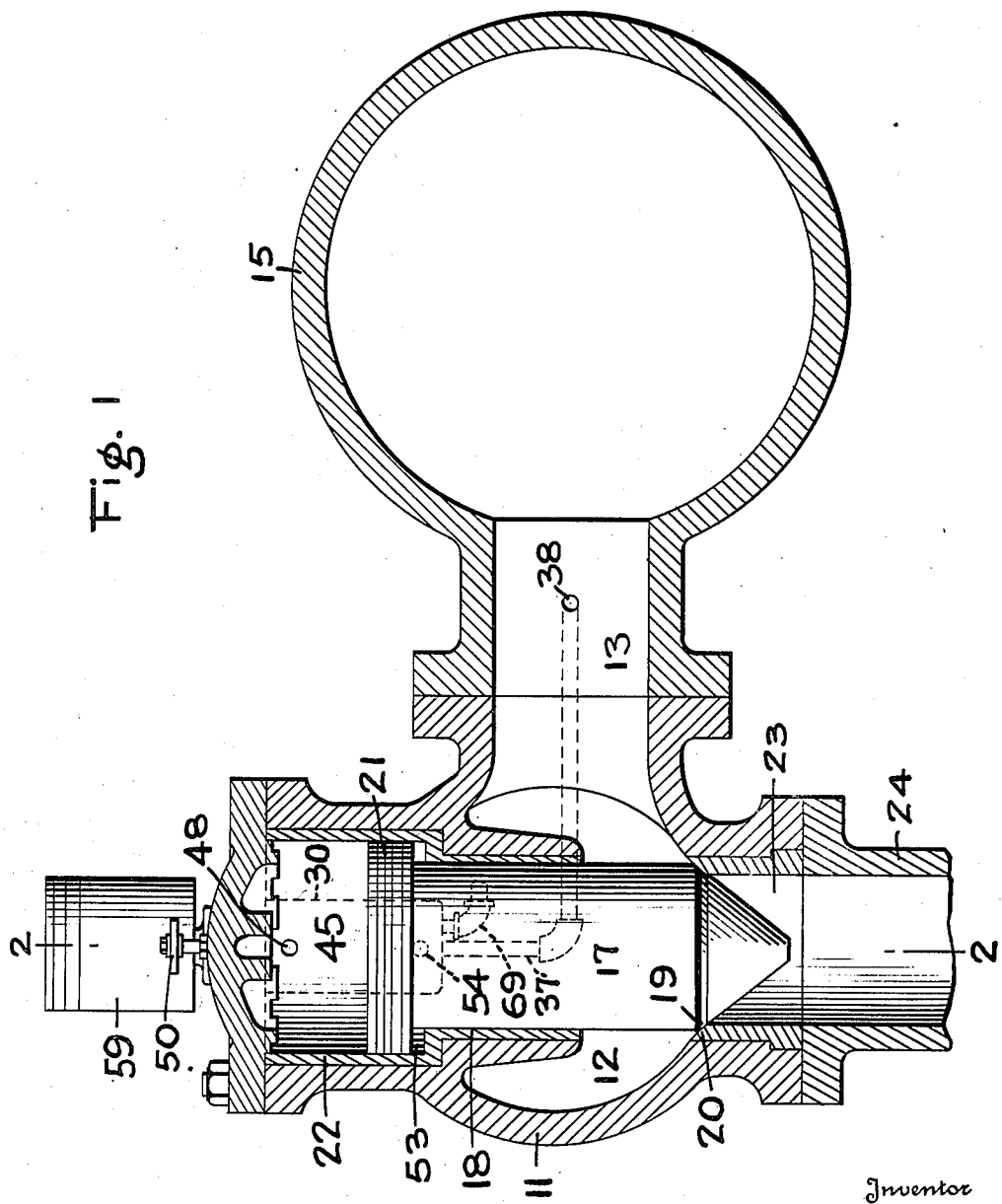
Inventor
ARTHUR G. SMITH
By Malcolm F. Gannett
Attorney Jan. 11, 1938.  A. G. SMITH  2,104,934
RELIEF VALVE
Filed Nov. 5, 1936  4 Sheets-Sheet 2
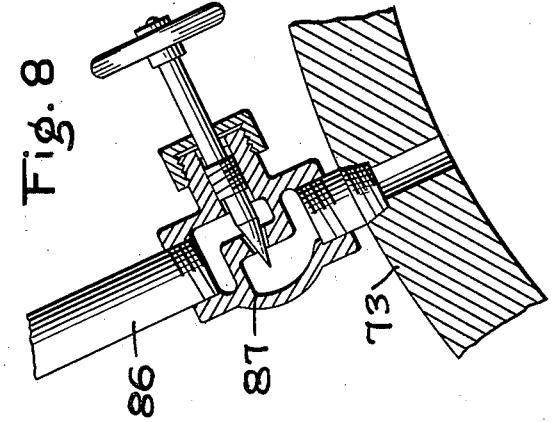
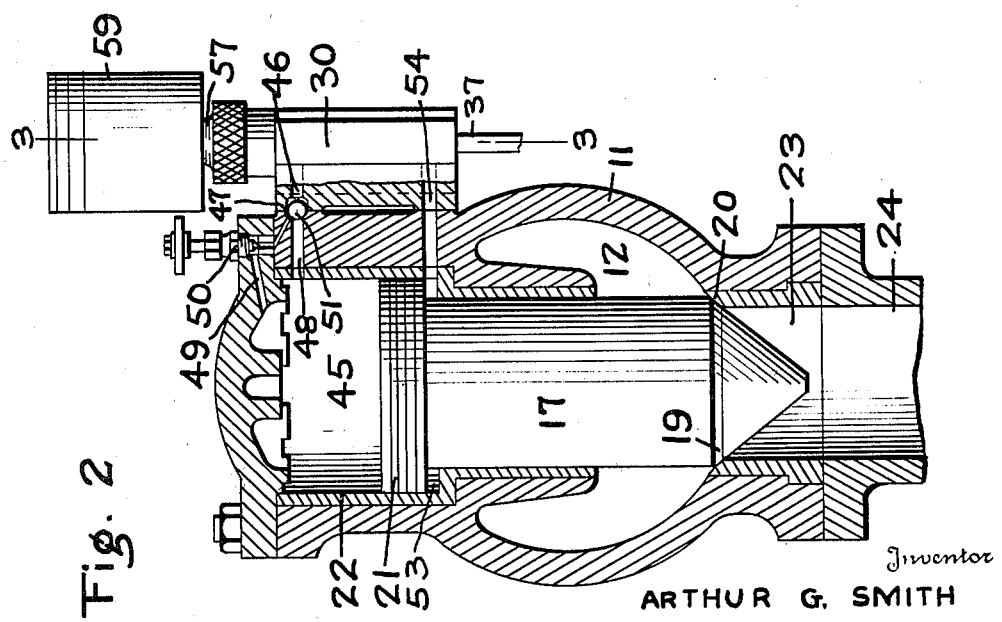
Inventor
ARTHUR G. SMITH
By Malcolm F. Gannett
Attorney Jan. 11, 1938.  A. G. SMITH  2,104,934
RELIEF VALVE
Filed Nov. 5, 1936  4 Sheets-Sheet 3
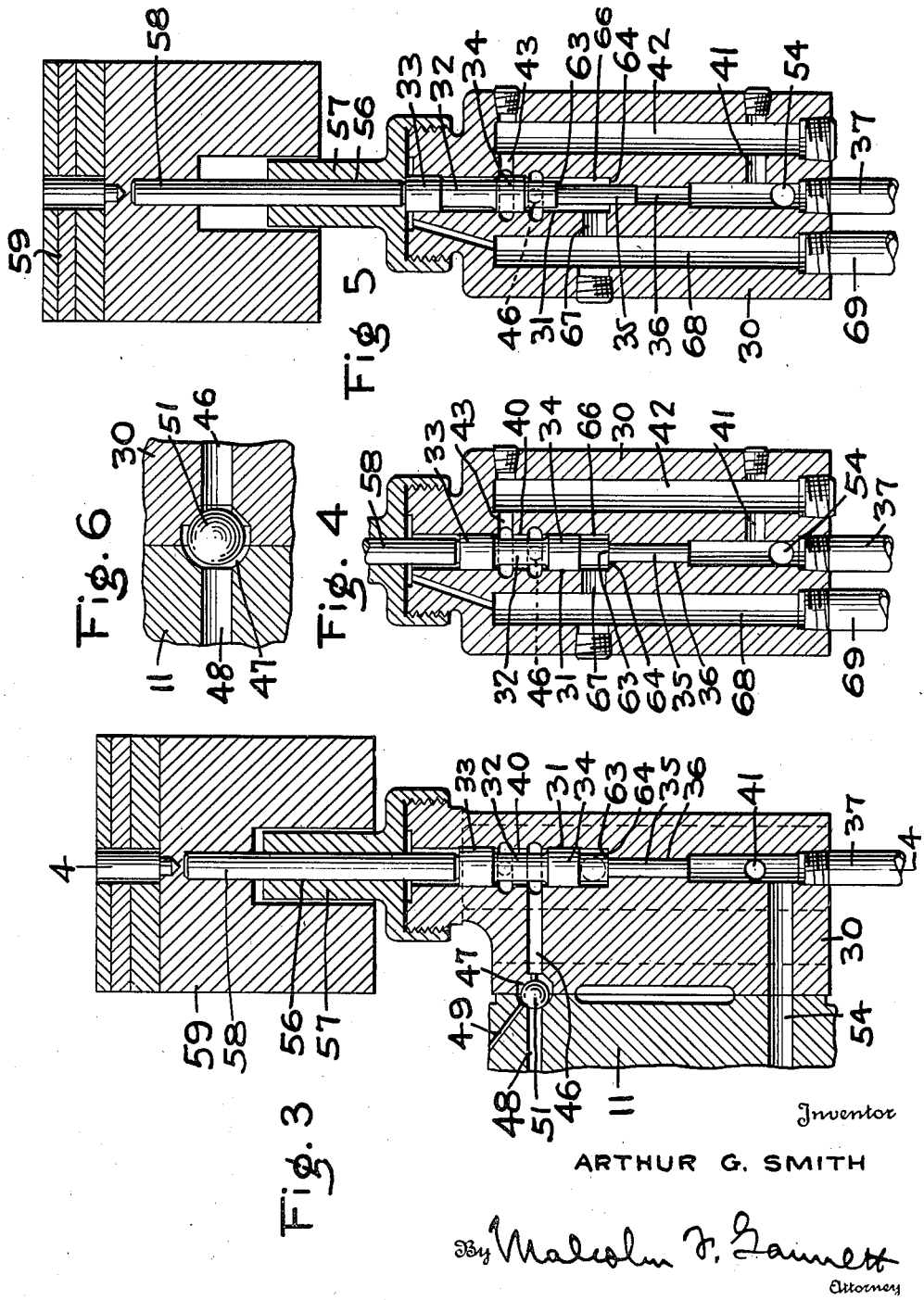
Inventor
ARTHUR G. SMITH
By Malcolm F. Gannett
Attorney Jan. 11, 1938.   A. G. SMITH   2,104,934
RELIEF VALVE
Filed Nov. 5, 1936   4 Sheets-Sheet 4

Inventor
ARTHUR G. SMITH
By Malcolm F. Gannett
Attorney

Patented Jan. 11, 1938

2,104,934

UNITED STATES PATENT OFFICE 2,104,934

RELIEF VALVE

Arthur G. Smith, York, Pa., assignor to S. Morgan Smith Company, York, Pa., a corporation of Pennsylvania Application November 5, 1936, Serial No. 109,239

3 Claims. (Cl. 137—53)

This invention relates to fluid pressure control means and particularly to relief valves of the type intended primarily to be used with pipe lines and the like, for quickly relieving the pressure of the fluid therein when the pressure of the fluid exceeds a predetermined amount.

An object of the invention is to provide an improved relief valve which is actuated through the operation of a pressure operated pilot valve directly connected to the fluid under pressure in the main pipe line.

Another object of the invention is to provide a simple, efficient and relatively inexpensive relief valve adapted to be actuated by fluid pressure under the control of a pilot valve which is balanced by means of a counter-weight.

Another object of the invention is to provide an improved automatic relief valve of the above type which is adapted to be manually operated at all times without interfering with the automatic function thereof.

With the foregoing and other objects and advantages in view, the invention consists in the construction and arrangement of the several parts which will be hereinafter more fully described and claimed.

In the accompanying drawings:—

Figure 1 is a vertical section of a relief valve embodying one form of the invention;

Fig. 2 is a vertical section taken on the line 2—2 of Fig. 1;

Fig. 3 is a vertical section of the pilot valve taken on the line 3—3 of Fig. 2;

Fig. 4 is a vertical section taken on the line 4—4 of Fig. 3, the parts being shown in one position;

Fig. 5 is a view similar to Fig. 4 showing the parts of the pilot valve in another position;

Fig. 6 is a horizontal section of the ball check valve shown in Fig. 3;

Fig. 8 is a vertical section of the needle valve.

Figure 7:
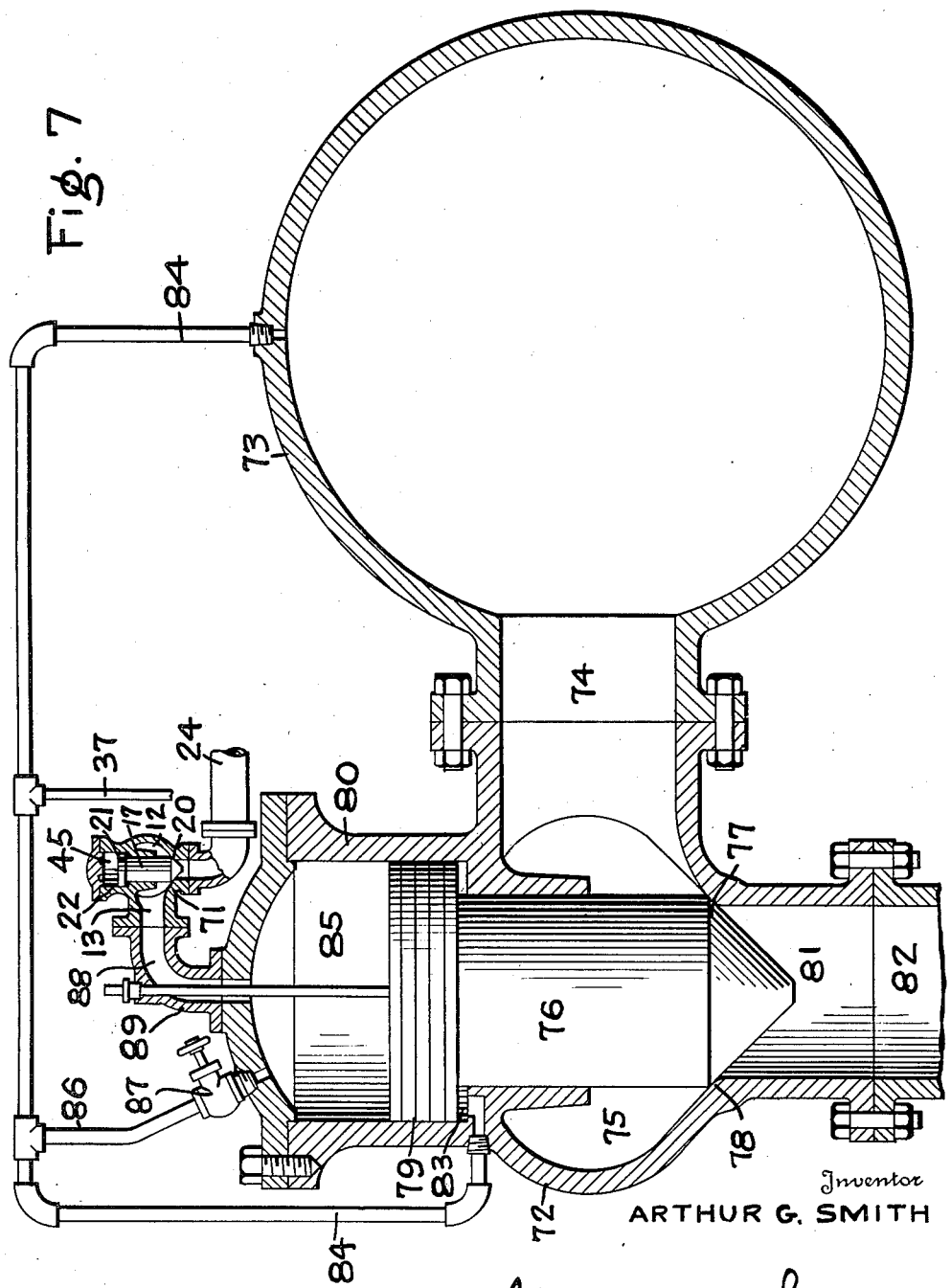
Fig. 7 is a section similar to Fig. 1 of another form of the invention.

Referring to the drawings, the improved relief valve comprises a casing 11 having a chamber 12 formed therein which is connected by a passage 13 to a header or main pipe line 15, so that said chamber is always in communication with said header, and the fluid under pressure in the header 15 is always present in valve chamber 12.

A piston valve 17 is mounted in a bore 18 formed in the body of the casing 11. The piston valve 17 comprises a main body portion which at one end is formed with a tapered portion 19 adapted to engage a seat 20 formed in the casing 11. The opposite end of the piston valve 17 is formed with a head or piston 21 which is mounted in a cylinder 22.

The piston valve 17 is adapted to control communication from chamber 12 to a passage 23 connected to a free discharge or sewer by a pipe 24. In order that the fluid can flow readily to the sewer when the valve operates, the passages 13 and 23 are preferably formed of approximately the same diameter, as shown in Fig. 1.

The valve seat 20 is preferably formed at the upper end of passage 23 so that when the piston valve 17 is seated communication is shut-off from chamber 12 to the sewer.

The piston valve 17 is adapted to be operated by fluid under pressure under the control of a pilot valve device 30. The pilot valve device 30 is adapted to be operated automatically by fluid under pressure, and said pilot valve device may also be manually operated in a manner to be hereinafter more fully described.

The pilot valve device 30 comprises a casing formed with a chamber 31, in which is mounted a plunger 32 formed with spaced heads 33 and 34 which fit fairly snugly within said chamber 31.

Below head 34, the plunger 32 is formed with a reduced downwardly extending portion 35 which is mounted in a bore 36.

The bore 36 extends downwardly to the bottom of the pilot valve casing where it is connected to one end of a pipe 37. The other end of the pipe 37 is connected to the header 15, as indicated at 38, Fig. 1, so that fluid under pressure in the header is conducted to bore 36 and acts on the bottom of the portion 35 of plunger 32, (see Figs. 3, 4, and 5).

In order that the fluid under pressure thus conducted to the pilot valve device 30 can be delivered to the relief valve for the purpose of actuating the same in the desired manner, bore 36 is connected with chamber 40 between plunger heads 33 and 34, through port 41, passage 42, and port 43.

Chamber 40 is connected to chamber 45 at the top of piston 21, through a passage 46, ball check valve chamber 47, and passage 48.

Leading from the ball check valve chamber 47 is another passage 49, which connects the chamber 47 with piston chamber 45, the flow of fluid through passage 49 being controlled by a needle valve 50 (see Fig. 2).

Mounted in the chamber 47 is a ball 51 adapted to check the flow of fluid from passage 46 to passage 48, but said ball is adapted to permit the flow of fluid from piston chamber 45, through passages 48 and 46, in the manner to be hereinafter more fully described. The construction is such that fluid under pressure is supplied to piston chamber 45 through passages 46 and 49 and fluid is exhausted from piston chamber 45 through passages 48 and 46.

Piston chamber 53 on the lower side of piston 21 is connected to bore 36 of the pilot valve 30 through a passage 54 (see Figs. 2, 3, 4, and 5).

Slidably mounted in a bore 56 of a tubular supporting member 57 mounted on top of the casing of the pilot valve device 30, is a rod 58 which supports a plurality of weights 59. As shown in Figs. 3 and 5, the weights 59 are of varying sizes to enable the desired amount of weight to be mounted on rod 58. These weights function as a counterweight in the manner to be hereinafter more fully described.

At the point where the main portion 32 of the plunger is connected to the reduced portion 35, there is a shoulder 63. Due to the downward forces exerted by the counterweight 59, the shoulder 63 of the plunger is normally retained in engagement with a shoulder 64 formed in the casing of the pilot valve device between the chamber 31 and the bore 36.

Below the head 34 of plunger 32 there is a chamber 66 which is connected to a sewer or the like through port 67, passage 68 and pipe 69.

As long as the pressure of the fluid in the header 15 does not exceed a predetermined amount, the pilot valve device will remain in the position shown in Figs. 3 and 4, so that fluid under pressure is supplied to piston chamber 45 from pipe 37 through port 41, passage 42, port 43, chamber 40, passage 46 past ball check valve 51, and passage 49 to piston chamber 45, so that the piston valve 17 is maintained seated against the seat 20, as shown in Figs. 1 and 2.

When the pressure of the fluid in the header 15 increases sufficiently so that the pressure acting on the plunger 32 overbalances the downward pressure exerted by the counterweight 59, the plunger will be raised to the position shown in Fig. 5. In this position head 34 will lap port 43 thereby cutting off the supply of fluid under pressure from pipe 37 to piston chamber 45.

At the same time piston chamber 45 will be connected to the sewer pipe 69 through passage 48, unseated ball check valve 51, passage 46, chamber 31, port 67, and passage 68. The pressure of the fluid supplied to piston chamber 53 from pipe 37 through passage 54, acting on the bottom of piston 21, causes the piston valve 17 to move rapidly upwardly away from the seat 20, thereby connecting chamber 12 with the free discharge provided by pipe 24. This results in a quick discharge of fluid under pressure from the header 15 through passage 13, chamber 12, and passages 23 and 24, so that the pressure of the fluid in the header 15 is quickly reduced.

As soon as the pressure of the fluid in the header 15 drops a predetermined amount, the force exerted by the counterweight 59 acting on the plunger 32 will move said plunger downwardly from the position shown in Fig. 5 to the position shown in Fig. 4, so that communication will again be established by which fluid under pressure will be supplied to piston chamber 45 in the manner heretofore described. It will be understood that the rate at which fluid under pressure is supplied to chamber 45 is regulated by the needle valve 50. In actual practice the rate at which the fluid is supplied to piston chamber 45 is relatively slow so that the piston valve 17 will be moved down towards seat 20 very slowly, thereby gradually closing the communication from the header 15 to the free discharge provided by sewer pipe 24, so that surges and hammering will be reduced to a minimum.

It will be understood that the piston valve 17 operates as a result of the differential in pressures of the fluid in piston chambers 45 and 53, and since chamber 45 is considerably larger in area than chamber 53, obviously, when the pressure of the fluid supplied to chamber 45 is in an amount sufficient to overbalance the pressure of the fluid in chamber 53, piston 21 will be forced downwardly. Such downward movement, however, is retarded to some extent by the presence of fluid under pressure in smaller piston chamber 53.

From the foregoing it will be noted that in operation the piston valve 17 moves from seated to open position at a rapid rate, and that said piston valve is returned to its seat at a very slow rate. Due to the fact that the piston valve is unseated rapidly and thus quickly establishes communication from the header to the free discharge, said piston valve obviously functions as a dump valve.

In the form of the invention shown in Fig. 7, two valve devices 71 and 72 similar to the valve device 11 hereinabove described are employed, one of said valve devices being considerably larger in size than the other.

When it is desired to control the pressure of fluid in a header of relatively large diameter, obviously a valve device should be employed through which the fluid can be quickly discharged when desired. Therefore, when the invention is used in connection with a relatively large header, it has been found desirable to control the operation of the larger valve device 72 by means of the smaller valve device 71.

In the arrangement of parts shown in Fig. 7, the valve device 72 is connected to the header 73 through a passage 74, which passage leads from the header 73 to chamber 75 of the valve device 72.

Valve device 72 is similar in construction to the valve device 11 heretofore described, having a piston valve 76, which at one end is formed with a tapered portion 77 adapted to engage a seat 78 formed in the casing of the valve 72. The opposite end of piston valve 76 is formed with a head or piston 79 which is mounted in a cylinder 80.

The piston valve 76 is adapted to control communication from chamber 75 to a passage 81 connected to a free discharge or sewer by a pipe 82.

Fluid under pressure from header 73 is supplied to chamber 83 on the lower side of piston 79 through a pipe 84.

Chamber 85 on the upper side of piston 79 is supplied with fluid from pipe 84 through a branch pipe 86, the rate at which the fluid is supplied to chamber 85 being controlled by a needle valve 87 (see Figs. 7 and 8).

Valve 71 shown in Fig. 7 corresponds to valve 11 heretofore described, and since the construction of these valves is the same, the parts of valve 71 shown in Fig. 7 corresponding to the same parts referred to by reference numerals in Figs. 1 and 2, are indicated in Fig. 7 by the same reference numerals.

It will also be understood that the operation of the valve 71 is controlled by a pilot valve device similar to the pilot valve device 30 shown in Figs. 2 and 3.

In the form of the invention shown in Fig. 7, chamber 12 is connected to piston chamber 85 of the larger valve 72 by means of a passage 88, the passage 88 being in the present instance formed in an elbow 89 fastened respectively to the top of cylinder 80 and to the extension of valve 71 having the passage 13 formed therein. In this way fluid under pressure in the piston chamber 85 is also always present in valve chamber 12.

As shown in Fig. 7, pipe 37 heretofore described leads from pipe 84, so that fluid under pressure from the header 73 is supplied to the pilot valve device (not shown) associated with valve 71.

As long as the pressure of the fluid in the header 73 does not exceed a predetermined amount, the valve devices 71 and 72 will remain in the position shown in Fig. 7.

When the pressure of the fluid in header 73 increases sufficiently so that the pressure acting on the plunger of the pilot valve device 30 overbalances the downward pressure of the counterweight 59 heretofore referred to, the pilot valve device 30 will be operated in the manner heretofore described with the result that piston valve 17 of valve 71 will be raised, thereby establishing communication from chamber 12 to the free discharge or sewer through pipe 24 (Fig. 7).

With piston chamber 85 thus connected to the sewer through passages 88, 13, and chamber 12, the pressure of the fluid supplied to piston chamber 83 causes the piston valve 76 to move rapidly upwardly away from the seat 77, thereby connecting chamber 75 with the free discharge provided by pipe 82. This results in a quick discharge of fluid under pressure from the header 73 through passage 74, chamber 75 and passage and pipe 81 and 82, respectively, so that the pressure of the fluid in the header 73 is quickly relieved.

As soon as the pressure of the fluid in the header 73 drops a predetermined amount the pilot valve device 30 will be operated in the manner heretofore described, and piston valve 17 will be returned to its seat 20, thereby closing the communication through which piston chamber 85 is connected to the free discharge or sewer.

It has heretofore been described that the downward movement of piston valve 17 is gradual, and therefore it will be obvious that through this slow movement of piston valve 17 the shutting off of the fluid flowing to the sewer through pipe 24 from piston chamber 85 will also be gradual. After the piston valve 17 is seated against the seat 20 the pressure of the fluid will gradually be built up in piston chamber 85 through the restricted orifice provided by needle valve 87, and in due course of time the piston valve 76 will be forced downwardly against seat 77, thereby cutting off the communication from chamber 75 to the free discharge or sewer. In this way the retarded or slow movement of piston valve 76 will prevent hammering or surges being produced in the header 73.

In the foregoing description the automatic operation of the two forms of the invention has been described, such automatic action being effected as a result of variations in the pressure of the fluid in the header.

Since the pilot valve device 30 is balanced by means of a counterweight, it will be obvious that should it be so desired to operate the device manually, it is but necessary for an operator or attendant to lift the weights 59, thereby permitting the plunger 32 to move upwardly in the manner heretofore described, so as to vent the fluid from piston chamber 45 and thereby effect operation of the piston valve 17 in the manner heretofore described.

It has been found desirable to employ the above referred to counterweight 59 since diaphragms, springs and other similar elements are eliminated, which diaphragms and springs often fail in actual practice, thereby rendering the valve device inoperative.

Having thus described my invention, what I claim is:—

1. A pressure relief valve comprising a casing having a chamber formed therein, said chamber adapted to be directly connected to a header, a tapered valve seat formed in the bottom of said chamber, a cylinder formed in the casing above said chamber in axial alinement with said valve seat, a bore formed in said casing between said chamber and said cylinder, said bore having a diameter less than the diameter of said cylinder, a main piston valve having a cylindrical body portion mounted in said bore and a piston head mounted within said cylinder, a tapered portion formed on the lower end of said cylindrical body portion for engagement with said valve seat, a passage leading from the valve seat to a free discharge and adapted to be closed when the main valve is in engagement with said valve seat, a passage leading from the chamber in said cylinder on the lower side of said piston to a source of fluid under pressure, two passages of different areas leading from the chamber on the upper side of the piston to a check valve chamber, a ball mounted in said check valve chamber and adapted to alternately control communication from the check valve chamber to said two passages, whereby fluid under pressure flows from the check valve chamber inwardly to the piston chamber on top of the piston through the smaller passage and fluid flows from the piston chamber on top of the piston outwardly through the larger passage, a single passage leading from said check valve chamber, and a pilot valve device operable by predetermined variations of pressure of the fluid in said header for controlling communication through said last named passage.

2. A pressure relief valve comprising a casing having a chamber formed therein, said chamber adopted to be directly connected to a header, a tapered valve seat formed in the bottom of said chamber, a cylinder formed in the casing above said chamber in axial alinement with said valve seat, a bore formed in said casing between said chamber and said cylinder, said bore having a diameter less than the diameter of said cylinder, a main piston valve having a cylindrical body portion mounted in said bore and a piston head mounted within said cylinder, a tapered portion formed on the lower end of said cylindrical body portion for engagement with said valve seat, a passage leading from the valve seat to a free discharge and adapted to be closed when the main valve is in engagement with said valve seat, a passage leading from the chamber in said cylinder on the lower side of said piston to a source of fluid under pressure, two passages of different areas leading from the chamber on the upper side of the piston to a check valve chamber, means for varying the rate of flow of fluid through the smaller passage, a ball mounted in said check valve chamber and adapted to alternately control communication from the check valve chamber to said two passages, whereby fluid under pressure flows from the check valve chamber inwardly to the piston chamber on top of the piston through the smaller passage and fluid flows from the piston chamber on top of the piston outwardly through the larger passage, a single passage leading from said check valve chamber, and a fluid pressure operated pilot valve device operable by predetermined variations of pressure of the fluid in said header for controlling communication through said last named passage.

3. A pressure relief valve comprising a casing having a chamber adapted to be directly connected to a header, a piston valve mounted in said casing for controlling communication from the chamber to a free discharge, said piston valve having a piston mounted in a cylinder of greater area than the diameter of the main body portion of the valve, a passage for providing communication between the chamber in said cylinder on the lower side of said piston and said header, two passages of different areas leading into the chamber on the upper side of the piston from a check valve chamber, means for supplying fluid under pressure to said check valve chamber and for exhausting fluid therefrom, and a check valve mounted within said check valve chamber and adapted to alternately control communication from the check valve chamber to said two passages whereby fluid under pressure is supplied to the upper piston chamber through the smaller passage and fluid is exhausted from the upper piston chamber through the larger passage, the latter passage being closed by the check valve when fluid is supplied to the upper piston chamber through the smaller passage.

ARTHUR G. SMITH.